United States Patent
Kusumi et al.

(10) Patent No.: US 11,021,067 B2
(45) Date of Patent: Jun. 1, 2021

(54) ELECTRICALLY POWERED VEHICLE AND CONTROL METHOD FOR ELECTRICALLY POWERED VEHICLE

(71) Applicant: TOYOTA JIDOSHA KABUSHIKI KAISHA, Toyota (JP)

(72) Inventors: Hidetoshi Kusumi, Nagoya (JP); Yoshihiko Hiroe, Toyota (JP); Tomoya Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 16/051,957

(22) Filed: Aug. 1, 2018

(65) Prior Publication Data
US 2019/0070971 A1    Mar. 7, 2019

(30) Foreign Application Priority Data

Sep. 5, 2017   (JP) .............................. JP2017-170451

(51) Int. Cl.
*H02J 7/00* (2006.01)
*H02J 7/14* (2006.01)
*B60L 11/18* (2006.01)
*B60L 58/19* (2019.01)
(Continued)

(52) U.S. Cl.
CPC .......... *B60L 11/1855* (2013.01); *B60L 53/11* (2019.02); *B60L 53/60* (2019.02); *B60L 58/19* (2019.02); *H02J 7/0024* (2013.01); *H02J 7/1415* (2013.01); *B60L 2210/12* (2013.01); *B60L 2210/14* (2013.01); *B60L 2240/547* (2013.01)

(58) Field of Classification Search
USPC .......................................................... 320/117
See application file for complete search history.

(56) References Cited

U.S. PATENT DOCUMENTS 6,064,178 A * 5/2000 Miller ................... H02J 7/0016
                                                  320/117
6,140,799 A * 10/2000 Thomasson ......... H01M 10/441
                                                  320/117
(Continued)

FOREIGN PATENT DOCUMENTS

| JP | H09-252530 A | 9/1997 |
| JP | 2012-175823 A | 9/2012 |

(Continued)

*Primary Examiner* — Alexis B Pacheco
(74) *Attorney, Agent, or Firm* — Oliff PLC

(57) ABSTRACT

An electrically powered vehicle includes electric power lines through which electric power supplied from external charger flows, an electric power storage device electrically connected to the electric power lines, a charging circuit electrically connected to the electric power lines, and an electronic control unit. The electric power storage device is configured to be charged with the electric power from the external charger. The charging circuit is configured to charge the electric power storage device in either a first state or a second state. The electronic control unit is configured to acquire charger information indicating information related to electric power to be suppliable from the external charger, generate the command by using the acquired charger information, and output the command to the charging circuit.

8 Claims, 9 Drawing Sheets

(51) Int. Cl.
*B60L 53/10* (2019.01)
*B60L 53/60* (2019.01)

(56) References Cited

U.S. PATENT DOCUMENTS

| | | | | |
|---|---|---|---|---|
| 6,462,511 | B1* | 10/2002 | Kwok | H02J 7/0024 320/119 |
| 7,723,954 | B2* | 5/2010 | Frucht | H02J 7/0024 320/117 |
| 8,288,992 | B2* | 10/2012 | Kramer | H02J 7/0016 320/117 |
| 2009/0079384 | A1* | 3/2009 | Harris | B60L 58/21 320/102 |
| 2011/0160019 | A1* | 6/2011 | Harada | B60W 20/13 477/7 |
| 2012/0109442 | A1* | 5/2012 | Kato | B60W 10/26 701/22 |
| 2012/0313584 | A1* | 12/2012 | Sugiyama | B60L 50/61 320/119 |
| 2012/0323423 | A1 | 12/2012 | Nakamura et al. | |
| 2014/0312828 | A1 | 10/2014 | Vo et al. | |
| 2015/0263390 | A1* | 9/2015 | Gagneur | H02J 7/0016 429/50 |
| 2015/0270801 | A1* | 9/2015 | Kessler | H02J 7/0024 318/139 |
| 2016/0280085 | A1* | 9/2016 | Shah | G01V 1/00 |
| 2016/0339795 | A1* | 11/2016 | Fink | H02J 7/34 |
| 2017/0129342 | A1* | 5/2017 | Tajima | B60L 53/36 |
| 2017/0217313 | A1 | 8/2017 | Hashimoto | |
| 2018/0045533 | A1* | 2/2018 | Jackson | G01C 21/3682 |
| 2018/0166750 | A1* | 6/2018 | Chang | B60L 3/04 |

FOREIGN PATENT DOCUMENTS

| | | |
|---|---|---|
| JP | 2013-038910 A | 2/2013 |
| JP | 2013-081316 A | 5/2013 |
| JP | 2013-198230 A | 9/2013 |
| JP | 2014-116989 A | 6/2014 |

* cited by examiner

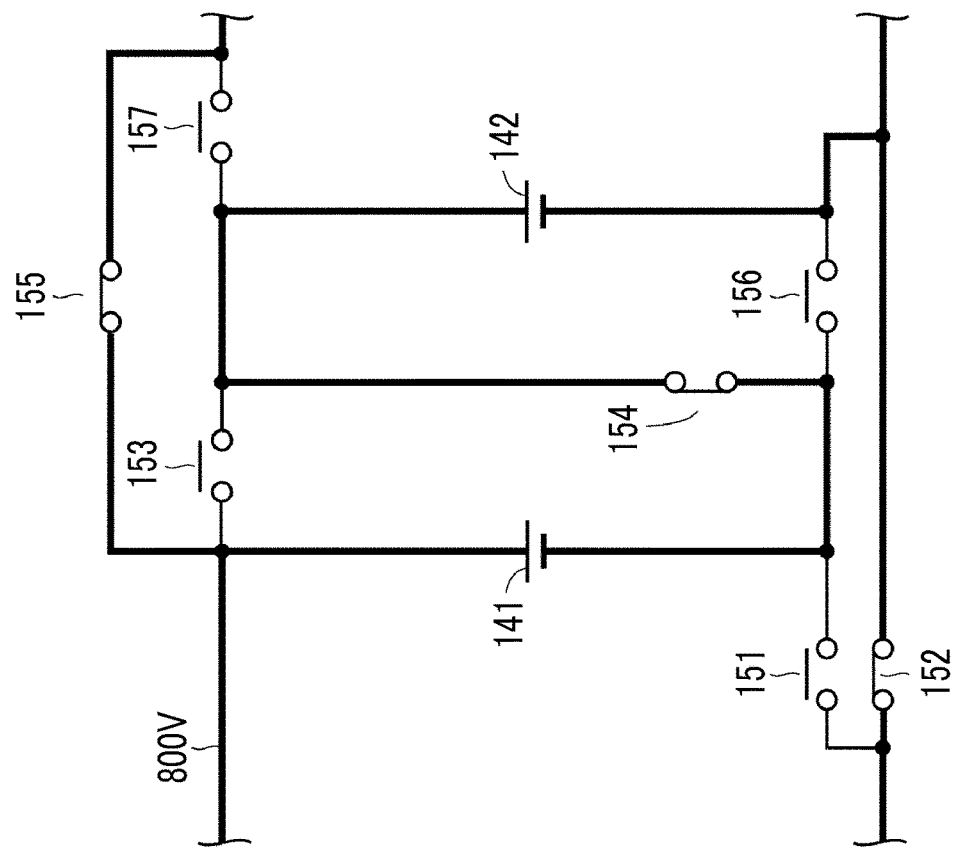
FIG. 3A HIGH VOLTAGE CHARGING MODE
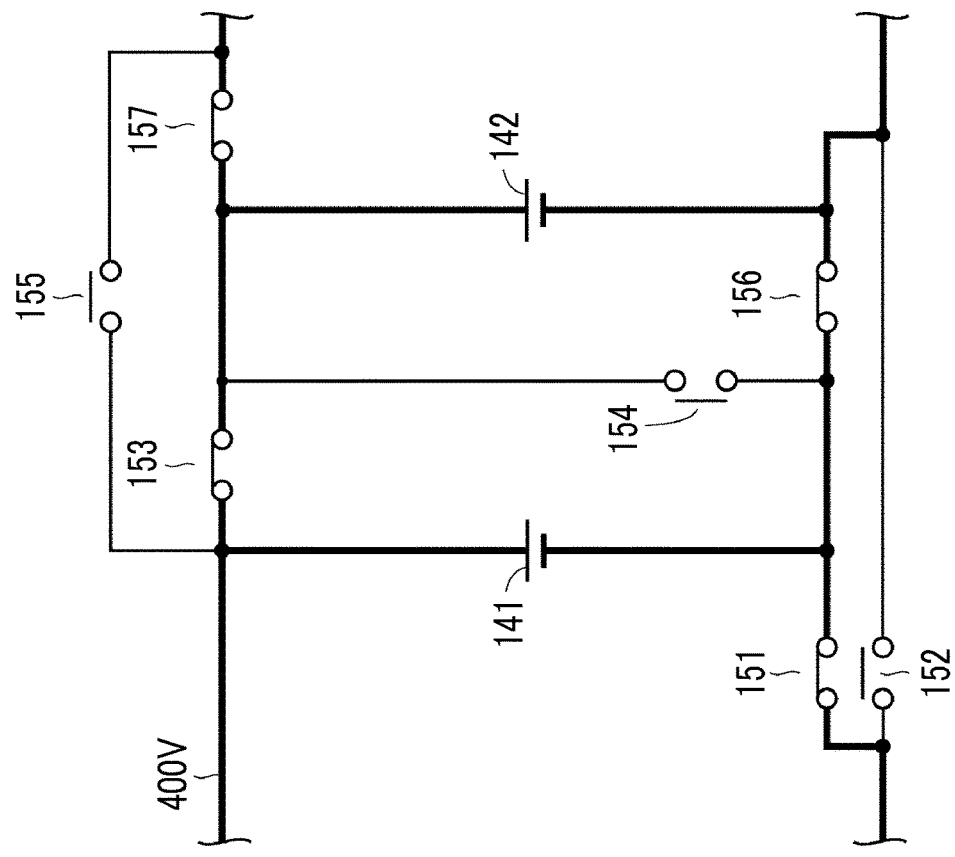
FIG. 3B ULTRA HIGH VOLTAGE CHARGING MODE

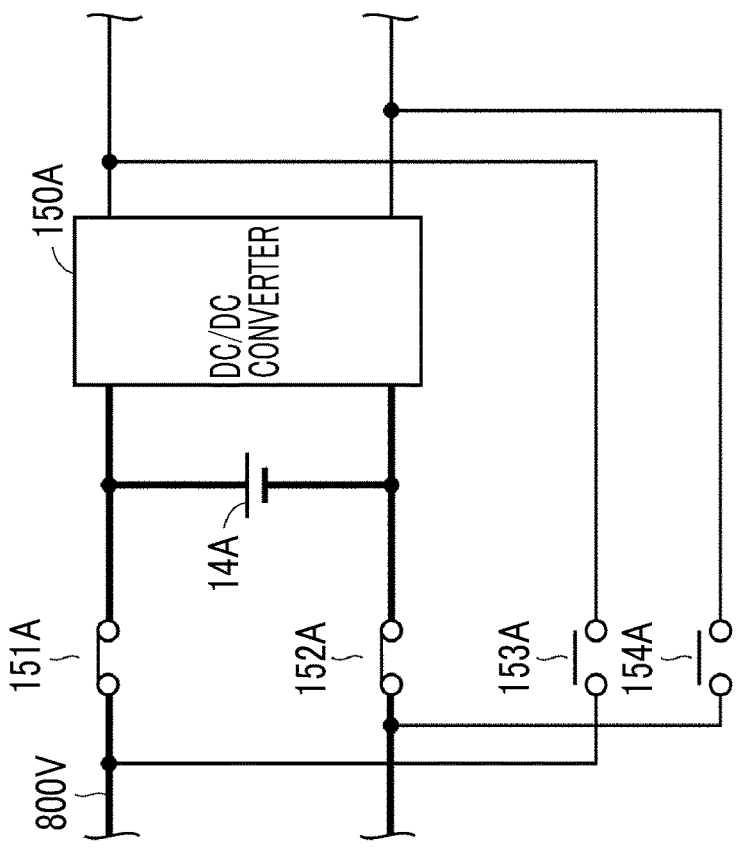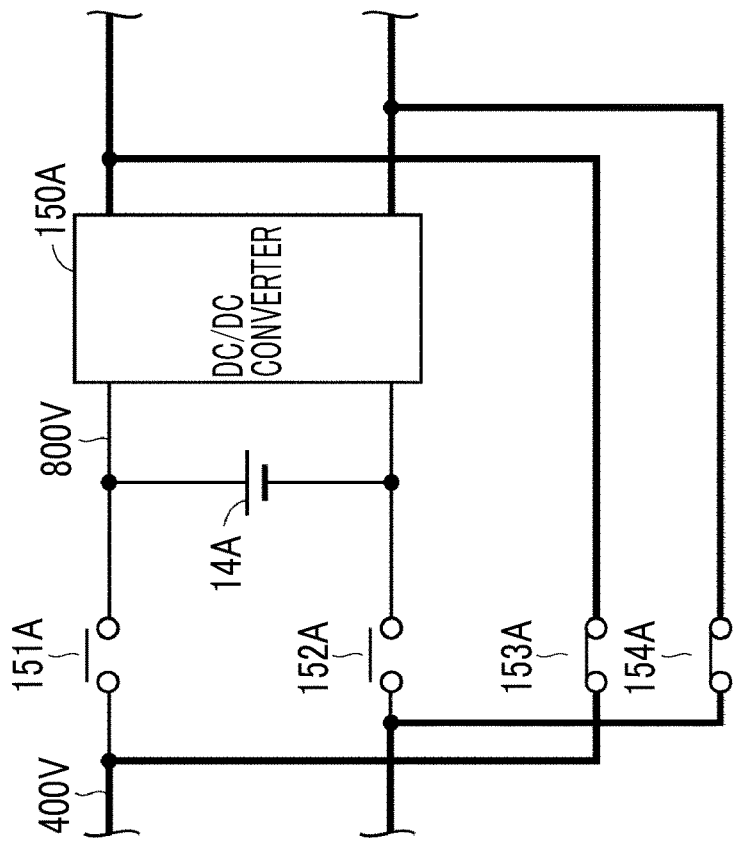

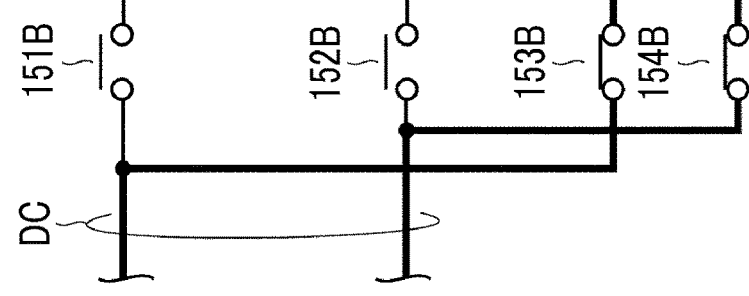
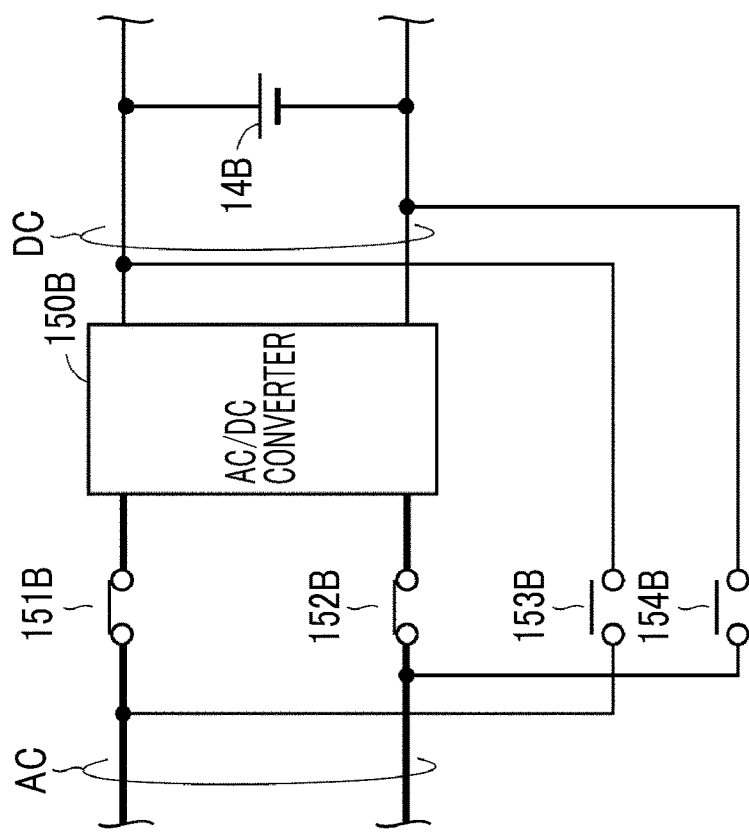

ELECTRICALLY POWERED VEHICLE AND CONTROL METHOD FOR ELECTRICALLY POWERED VEHICLE

INCORPORATION BY REFERENCE

The disclosure of Japanese Patent Application No. 2017-170451 filed on Sep. 5, 2017 including the specification, drawings and abstract is incorporated herein by reference in its entirety.

BACKGROUND

1. Technical Field

The present disclosure relates to an electrically powered vehicle and a control method for an electrically powered vehicle and, more particularly, to a charging technique for charging an electric power storage device mounted in an electrically powered vehicle with electric power supplied from an external charger disposed outside the vehicle.

2. Description of Related Art

Development of electrically powered vehicles in which an electric power storage device is mounted is in progress. The electrically powered vehicles include a vehicle (such as an electric vehicle and a plug-in hybrid vehicle) configured such that the electric power storage device can be charged with electric power supplied from a charging device disposed outside the vehicle. In the following description, this type of charging will also be referred to as "external charging".

It is also conceivable that the externally chargeable electrically powered vehicle adopts a configuration in which an electric power storage device including a plurality of electric power storage units is mounted. Techniques relating to methods for using the electric power storage units in the configuration as described above have been proposed.

For example, the vehicle that is disclosed in Japanese Unexamined Patent Application Publication No. 2013-081316 (JP 2013-081316 A) is configured to be switchable between a state where the electric power storage units are interconnected in series (series connection state) and a state where the electric power storage units are interconnected in parallel (parallel connection state). According to JP 2013-081316 A, switching between the series connection state and the parallel connection state is performed based on the temperature and the state of charge (SOC) of the electric power storage units.

SUMMARY

It can be said that a transition period is ongoing in which fossil fuel-consuming vehicles according to the related art are being replaced with externally chargeable electrically powered vehicles. Electrically powered vehicle market expansion and charging infrastructure maintenance are also being promoted.

In general, the specifications of external chargers (such as charging stations) as charging infrastructure, such as rated voltages and rated currents, are standardized by international standards and the like. Regarding the specifications as described above, specifications (demanded performances) demanded for external chargers may change with rapid electrically powered vehicle development, and then standards different from existing standards may be established.

This may result in a market situation in which external chargers with different specifications are used at the same time (details of the above background will be described later).

For example, the specifications of external chargers are not specifically considered with regard to the vehicle that is disclosed in JP 2013-081316 A. Accordingly, appropriate external charging may be impossible depending on the external charger that is used in a situation in which external chargers with different specifications are present in the same place.

The present disclosure provides an electrically powered vehicle and a control method for an electrically powered vehicle allowing appropriate external charging to be performed, in accordance with the specifications of an external charger, for a vehicle configured to be externally chargeable.

A first aspect of the present disclosure relates to an electrically powered vehicle. The electrically powered vehicle includes electric power lines through which electric power supplied from an external charger flows, an electric power storage device electrically connected to the electric power lines and configured to be charged with the electric power from the external charger, a charging circuit, and an electronic control unit. The charging circuit is electrically connected to the electric power lines. The charging circuit is configured to switch a connection state of the electric power storage device and the electric power lines between a first state and a second state in accordance with a given command. The charging circuit is configured to charge the electric power storage device in either the first state or the second state. The electronic control unit is configured to acquire charger information indicating information related to electric power to be suppliable from the external charger, generate the command by using the acquired charger information, and output the command to the charging circuit.

According to the first aspect of the present disclosure, the connection state of the electric power storage device and the electric power lines is switched to either the first state or the second state by the charger information being used. By the charger information being used as described above, appropriate external charging can be performed in accordance with the specifications of the external charger.

In the electrically powered vehicle according to the first aspect of the present disclosure, the external charger may be configured to supply direct current electric power. The first state may be a connection state for charging the electric power storage device at a first specified voltage. The second state may be a connection state for charging the electric power storage device at a second specified voltage higher than the first specified voltage. The electronic control unit may be configured to acquire, as the charger information, information related to the highest voltage of direct current electric power to be suppliable from the external charger. The electronic control unit may be configured to generate the command such that the connection state becomes the first state when the acquired highest voltage is equal to or lower than a predetermined voltage. The electronic control unit may be configured to generate the command such that the connection state becomes the second state when the highest voltage is higher than the predetermined voltage.

According to the first aspect of the present disclosure, the connection state of the electric power storage device and the electric power lines is switched in accordance with the highest voltage of the direct current electric power to be suppliable from the external charger. Charging time can be shortened because charging with large electric power can be performed in a short time by means of the highest voltage.

In the electrically powered vehicle according to the first aspect of the present disclosure, the electric power storage device may include a first electric power storage unit and a second electric power storage unit. The charging circuit may include a plurality of relays. The relays may be configured such that switching between opening and closing of each of the relays is controlled in accordance with the command. In the first state, the relays may be controlled such that the first electric power storage unit and the second electric power storage unit are interconnected in parallel. In the second state, the relays may be controlled such that the first electric power storage unit and the second electric power storage unit are interconnected in series.

According to the first aspect of the present disclosure, switching between the charging at the first specified voltage and the charging at the second specified voltage can be performed even without a step-up device or a voltage conversion device. In other words, the charging voltage can be switched with a simple configuration.

In the electrically powered vehicle according to the first aspect of the present disclosure, the charging circuit may include a step-up device and a plurality of relays. The step-up device may be configured to step up a voltage of the direct current electric power supplied from the external charger. The relays may be configured such that switching between opening and closing of each of the relays is controlled in accordance with the command. In the first state, the relays may be controlled such that the electric power storage device is charged with the voltage of the direct current electric power from the external charger stepped up by the step-up device. In the second state, the relays may be controlled such that the electric power storage device is charged with the voltage of the direct current electric power from the external charger not via the step-up device.

According to the first aspect of the present disclosure, switching between the charging at the first specified voltage and the charging at the second specified voltage is performed in accordance with the use or non-use of the step-up device. Also by the use of the step-up device, the charging voltage can be switched even in a configuration in which the electric power storage device is not divided into two.

The electrically powered vehicle according to the first aspect of the present disclosure may further include a drive device configured to generate a drive force of the electrically powered vehicle by using electric power. The step-up device may be a step-up and step-down device configured to step up a voltage of direct current electric power supplied from the external charger to the electric power storage device, and step down a voltage supplied from the electric power storage device to the drive device.

According to the first aspect of the present disclosure, a single step-up and step-down device is capable of realizing both charging of the electric power storage device with electric power supplied from the external charger and driving of the drive device by means of electric power supplied from the electric power storage device.

In the electrically powered vehicle according to the first aspect of the present disclosure, the charger information may include information indicating whether the electric power supplied from the external charger is direct current electric power or alternating current electric power. The charging circuit may include an electric power conversion device and a plurality of relays. The electric power conversion device may be configured to convert the alternating current electric power supplied from the external charger into direct current electric power when the external charger supplies the alternating current electric power. The relays may be configured such that switching between opening and closing a each of the relays is controlled in accordance with the command. In the first state, the relays may be controlled such that the electric power storage device is charged with the alternating current electric power from the external charger converted into the direct current electric power by the electric power conversion device. In the second state the relays may be controlled such that the electric power storage device is charged with the direct current electric power from the external charger not via the electric power conversion device.

According to the first aspect of the present disclosure, appropriate external charging can be performed in accordance with the type (direct current or alternating current) of the electric power supplied from the external charger, by the use of the charger information, even in a situation in which an external charger supplying direct current electric power and an external charger supplying alternating current electric power are used at the same time.

In the electrically powered vehicle according to the first aspect of the present disclosure, the electronic control unit may be configured to output the command to the charging circuit before initiation of execution of the external charging. According to the first aspect of the present disclosure, appropriate external charging can be initiated in accordance with the specifications of the external charger.

The electrically powered vehicle according to the first aspect of the present disclosure may further include a communication device configured to perform communication with the external charger. The electronic control unit may be configured to acquire the charger information via the communication between the external charger and the communication device.

The electrically powered vehicle according to the first aspect of the present disclosure may further include a position information acquirer configured to acquire position information regarding the external charger. The electronic control unit may be configured to acquire the charger information by using the position information acquired by the position information acquirer.

According to the first aspect of the present disclosure, the charger information can be appropriately acquired by means of the communication with the communication device or the position information.

A second aspect of the present disclosure relates to a control method for an electrically powered vehicle. The electrically powered vehicle includes electric power lines through which electric power supplied from an external charger flows, an electric power storage device electrically connected to the electric power lines, a charging circuit electrically connected to the electric power lines, and an electronic control unit. The electric power storage device is configured to be charged with the electric power from the external charger. The charging circuit is configured to switch a connection state of the electric power storage device and the electric power lines between a first state and a second state in accordance with a given command. The charging circuit is configured to charge the electric power storage device in either the first state or the second state. The control method according to the second aspect of the present disclosure includes: acquiring, by the electronic control unit, charger information indicating information related to electric power to be suppliable from the external charger; and outputting, by the electronic control unit, the command based on the acquired charger information to the charging circuit.

According to the aspects of the present disclosure, appropriate external charging can be performed, in accordance with the specifications of an external charger, for a vehicle configured to be externally chargeable.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3A is a diagram for showing the state of the charging circuit in a high voltage charging mode;

FIG. 3B is a diagram for showing the state of the charging circuit in an ultra high voltage charging mode;

FIG. 7A is a diagram for showing the state of the electric power storage device and the charging circuit in the high voltage charging mode;

FIG. 7B is a diagram for showing the state of the electric power storage device and the charging circuit in the ultra high voltage charging mode;

FIG. 9A is a diagram for showing the state of the electric power storage device and the charging circuit in an alternating current (AC) charging mode; and FIG. 9B is a diagram for showing the state of the electric power storage device and the charging circuit in a direct current (DC) charging mode.

DETAILED DESCRIPTION OF EMBODIMENTS

Figure 1:
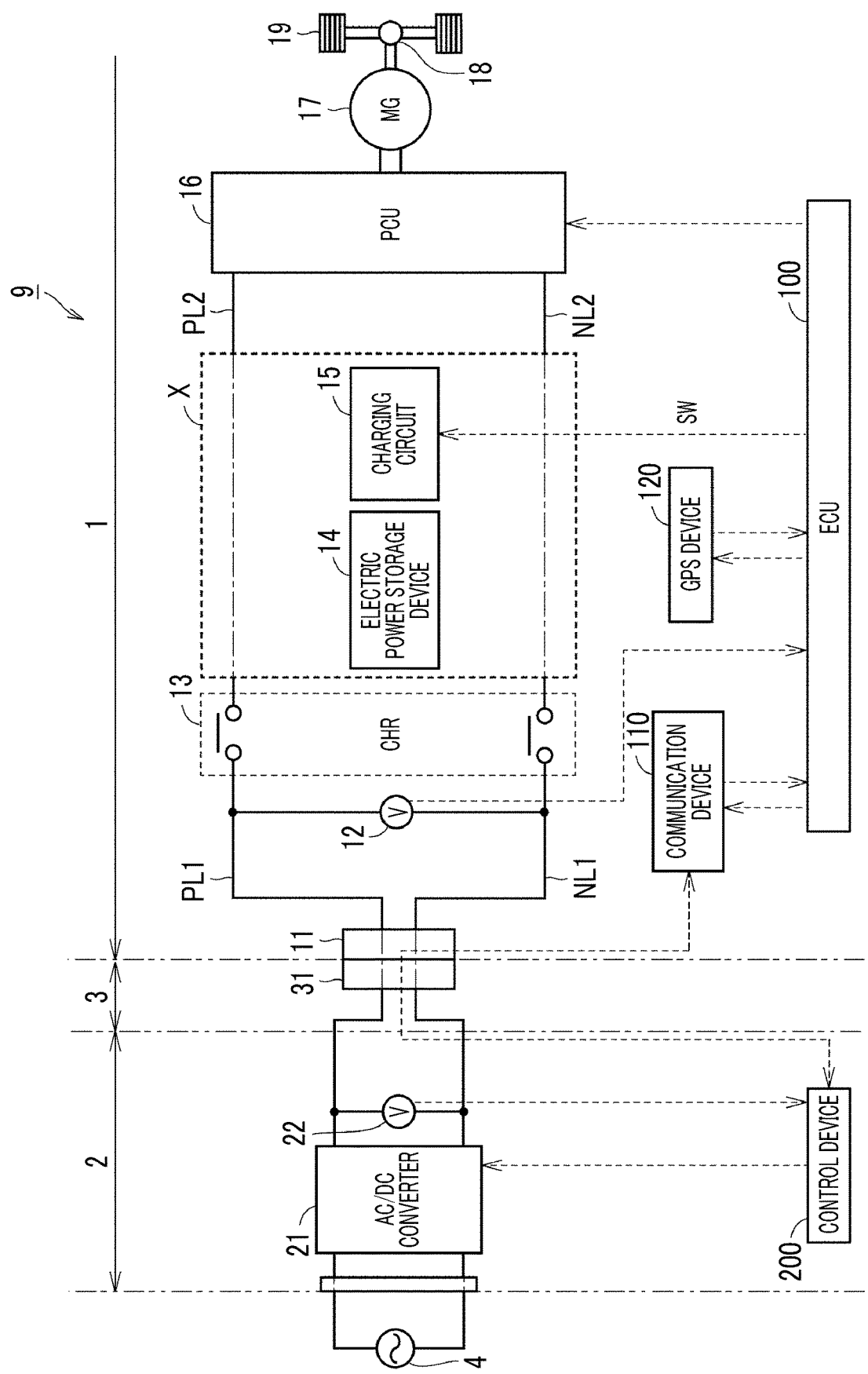
FIG. 1 is a block diagram schematically illustrating an overall configuration of an external charging system including a vehicle according to a first embodiment.

Hereinafter, embodiments of the present disclosure will be described in detail with reference to accompanying drawings. In the drawings, the same reference numerals will be used to refer to the same or equivalent parts so that the same description is not repeated.

First Embodiment

Overall Configuration of External Charging System

FIG. 1 is a block diagram schematically illustrating an overall configuration of an external charging system including an electrically powered vehicle according to a first embodiment. Referring to FIG. 1, an external charging system 9 is provided with a vehicle 1 and a charging station 2.

In the first embodiment, the charging station 2 is a charging station for so-called DC charging and converts alternating current electric power from a system electric power source 4 (such as a commercial electric power source) into direct current electric power for charging an electric power storage device 14 mounted in the vehicle 1. The charging station for DC charging as described above is larger in allowable current value than a general charging station for AC charging, and thus the charging time of the charging station for DC charging can be shortened. More specifically, the charging station 2 is provided with an AC/DC converter 21, a voltage sensor 22, and a control device 200.

The AC/DC converter 21 converts the alternating current electric power from the system electric power source 4 into the direct current electric power for charging the electric power storage device 14. The electric power conversion by the AC/DC converter 21 may be executed by combination between AC/DC conversion for power factor improvement and DC/DC conversion for voltage level adjustment.

The voltage sensor 22 detects the voltage of the direct current electric power output from the AC/DC converter 21 and outputs the result of the above-described detection to the control device 200.

The control device 200 is configured to include a central processing unit (CPU, not illustrated), a memory (not illustrated), and an input-output buffer (not illustrated). The control device 200 controls the charging station 2 based on the voltage detected by the voltage sensor 22, a command from the vehicle 1, and a map and a program stored in the memory. The control will be described in detail later. The charging station 2 is an example of the "external charger" according to the present disclosure.

The vehicle 1 and the charging station 2 are electrically interconnected via a charging cable 3 during external charging. The charging cable 3 includes a connector 31 configured to be electrically connectable to an inlet 11 of the vehicle 1. The electrical connection between the vehicle 1 and the charging station 2 is maintained by mechanical connection (such as fitting) between the connector 31 and the inlet 11.

The vehicle 1 is, for example, an electric vehicle and is provided with the inlet 11, electric power lines PL1, NL1, a voltage sensor 12, a charging relay 13, the electric power storage device 14, a charging circuit 15, electric power lines PL2, NL2, a power control unit (PCU) 16, a motor generator 17, a power transmission gear 18, drive wheels 19, an electronic control unit (ECU) 100, a communication device 110, and a global positioning system (GPS) device 120. The vehicle 1 may also be a plug-in hybrid vehicle in which an engine (not illustrated) is further mounted.

The voltage sensor 12 is connected between the electric power line PL1 and the electric power line NL1 on a side that is closer to the inlet 11 than the charging relay 13. The voltage sensor 12 detects the direct current voltage between the electric power lines PL1, NL1 and outputs the result of the above-described detection to the ECU 100.

The charging relay 13 includes a relay connected to the electric power line PL1 and a relay connected to the electric power line NL1. The closing and opening of the charging relay 13 is controlled in accordance with a command from the ECU 100. Once the charging relay 13 is closed, electric power can be transmitted between the inlet 11 and the electric power storage device 14.

The electric power storage device 14 is configured to include a secondary battery that can be charged and discharged (typically, a lithium ion secondary battery or a nickel hydrogen battery) and supplies the motor generator 17 with electric power for generating the drive force of the vehicle 1. The electric power storage device 14 stores electric power supplied from the charging station 2 or electric power generated by the motor generator 17. A capacitor such as an electric double layer capacitor may be adopted for the electric power storage device 14 instead of the secondary battery.

The charging circuit 15 is electrically connected to the electric power lines PL1, NL1, PL2, NL2 between the inlet 11 and the PCU 16 and switches the connection state of the electric power storage device 14 and the electric power lines PL1, NL1, PL2, NL2 to either a first state or a second state in accordance with a switching command SW given from the ECU 100. The electric power storage device 14 is configured to be charged as a result of the above. The configuration of the electric power storage device 14 and the charging circuit 15 will be described in detail with reference to FIGS. 2, 3A, and 3B.

The PCU 16 is configured to include, for example, an inverter (not illustrated). The PCU 16 executes bidirectional electric power conversion between the electric power storage device 14 and the motor generator 17 in accordance with a control command from the ECU 100. The PCU 16 is an example of the "drive device" according to the present disclosure.

The motor generator 17 is an alternating current rotary electric machine. The torque that is output by the motor generator 17 is transmitted to the drive wheels 19 via the power transmission gear 18 including a decelerator and a power split device, and then the vehicle 1 travels. During regenerative braking of the vehicle 1, the motor generator 17 is capable of generating electric power by means of the rotational force of the drive wheels 19. When the drive force of the vehicle is generated from a powering operation of the motor generator 17, the PCU 16 converts the direct current electric power from the electric power storage device 14 into alternating current electric power for positive torque generation and outputs the alternating current electric power to the motor generator 17. When the motor generator 17 performs regenerative braking during deceleration of the vehicle 1, the PCU 16 converts the alternating current electric power generated by the motor generator 17 into direct current electric power and outputs the direct current electric power to the electric power storage device 14.

The ECU 100 is configured to include a CPU (not illustrated), a memory (not illustrated), and an input-output buffer (not illustrated) as is the case with the control device 200 of the charging station 2. The ECU 100 controls equipment, such that the vehicle 1 is put into a desired state, in accordance with a signal from each sensor or the like. "External charging control" is an example of the main control executed by the ECU 100. The external charging control will be described later.

The communication device 110 is capable of transmitting and receiving various signals, commands, and information (data) to and from the control device 200 of the charging station 2 in accordance with a predetermined communication standard or the like in a state where the charging cable 3 is connected to the inlet 11. As described with reference to FIG. 4, the external charging control proceeds by the signals and so on being transmitted and received between the ECU 100 of the vehicle 1 and the control device 200 of the charging station 2.

The GPS device 120 includes a GPS receiver (not illustrated) for specifying the position of the vehicle 1 based on radio waves from an artificial satellite. The GPS device 120 is, for example, a navigation device and executes various types of navigation processing for the vehicle 1 by using the position information regarding the vehicle 1 specified by the GPS receiver. The position information regarding the vehicle 1 is output to the ECU 100 via an in-vehicle network. The GPS device 120 is an example of a "position information acquirer".

Specifications of External Charger

In general, the specifications of external chargers (such as charging stations) as charging infrastructure, such as rated voltages and rated currents, are standardized by international standards and the like. Regarding the specifications as described above, specifications (demanded performances) demanded for external chargers may change with rapid electrically powered vehicle development, and then standards different from existing standards may be established. This may result in a market situation in which external chargers with different specifications are used at the same time.

One of the background reasons for the likelihood of the above-described situation will be described below. In many cases, the electric power storage device mounted in an electric vehicle is larger in full charge capacity than the electric power storage device mounted in another vehicle (such as a plug-in hybrid vehicle), and thus the charging time of the electrically powered vehicle tends to be longer. Accordingly, it is desirable that the charging time is shortened by an increase in charging electric power to the electric power storage device. A method for increasing a charging voltage and a method for increasing a charging current are available for an increase in charging electric power. The method for increasing a charging current, however, may demand a measure such as high current counterpart adoption for a component part (such as a relay) disposed on a charging current path. Accordingly, it is conceivable to increase a charging voltage while suppressing an increase in charging current.

For example, at an external charger performing DC charging (charging station 2 in the example of FIG. 1), a charging station performing charging at a predetermined high voltage (such as approximately 400 V) is already present. Predictable from the above is a situation in which a charging station performing charging at an existing high voltage (approximately 400 V) and a charging station performing charging at an even higher voltage (such as approximately 800 V) are present in the same place.

In a case where the specifications of the charging station 2 are not specifically considered, appropriate external charging may be impossible depending on the external charger that is used under a situation in which external chargers with different specifications are present in the same place due to the above-described background.

In the first embodiment, a configuration is adopted in which the vehicle 1 acquires "charger information I" indicating information relating to electric power that can be supplied from the charging station 2, the switching command SW for performing charging with appropriate electric power is generated by means of the acquired charger information I, and the switching command SW is output to the charging circuit 15. More specifically, the ECU 100 has a "high voltage charging mode" in which charging is performed at an existing high voltage (approximately 400 V) and an "ultra high voltage charging mode" in which charging is performed at an even higher voltage (approximately 800 V). The ECU 100 selects an appropriate charging mode from the high voltage charging mode and the ultra high voltage charging mode based on the charger information I.

Configuration of Electric Power Storage Device and Charging Circuit

Figure 2:
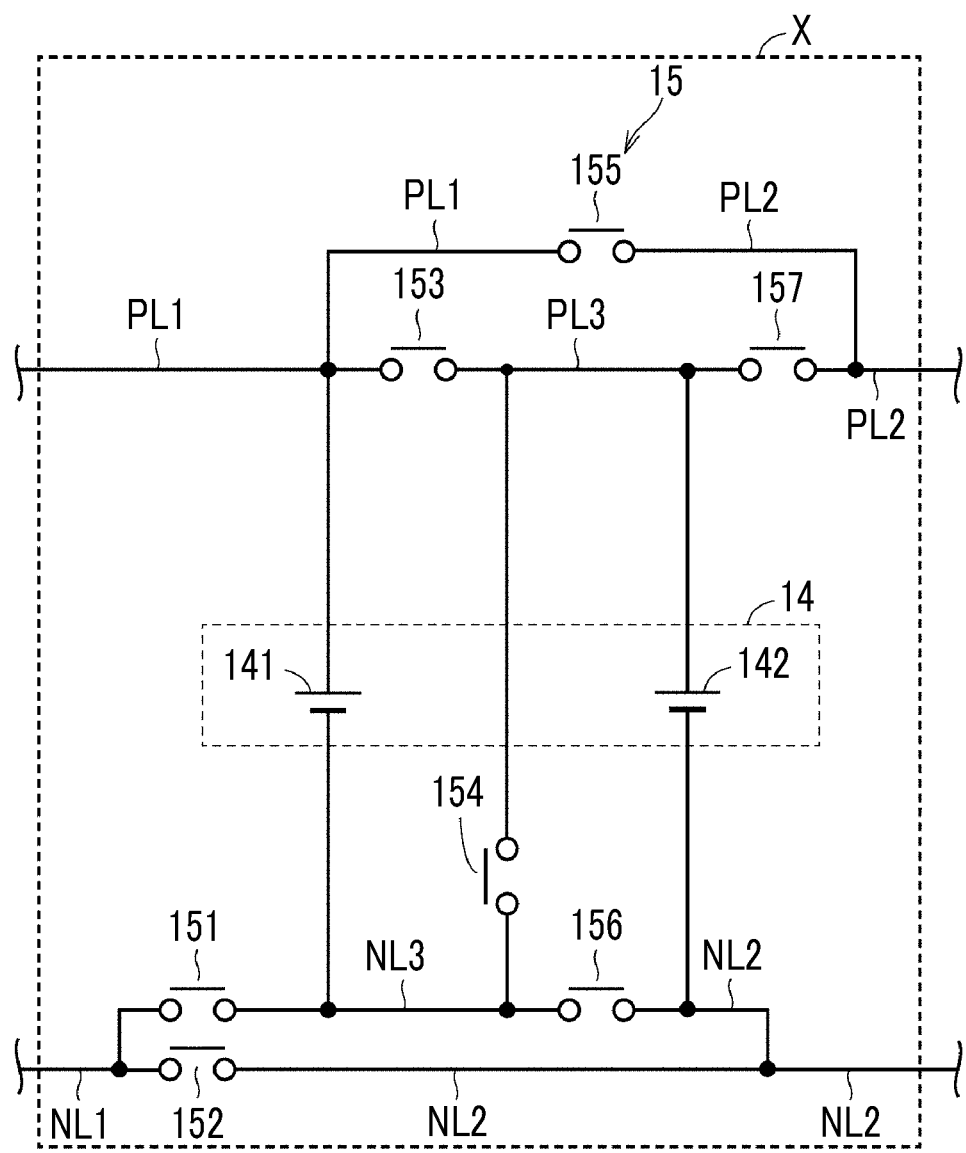
FIG. 2 is a diagram illustrating the configuration of an electric power storage device and a charging circuit according to the first embodiment in more detail.

FIG. 2 is a diagram illustrating the configuration of the electric power storage device 14 and the charging circuit 15

(configuration of the region surrounded by the dotted-line frame X in FIG. 1) according to the first embodiment in more detail. Referring to FIG. 2, the electric power storage device 14 includes batteries 141, 142 that basically have a common configuration. The battery 141 is electrically connected between the electric power line PL1 and an electric power line NL3. The battery 142 is electrically connected between an electric power line PL3 and the electric power line NL2. Each of the batteries 141, 142 has a voltage of, for example, approximately 400 V. The battery 141 is an example of the "first electric power storage unit" according to the present disclosure and the battery 142 is an example of the "second electric power storage unit" according to the present disclosure.

The charging circuit 15 includes, for example, relays 151 to 157 connected to the electric power lines PL1 to PL3 and NL1 to NL3. More specifically, the relay 151 is electrically connected between the electric power line NL1 and the electric power line NL3. The relay 152 is electrically connected between the electric power line NL1 and the electric power line NL2. The relay 153 is electrically connected between the electric power line PL1 and the electric power line PL3. The relay 154 is electrically connected between the electric power line PL3 and the electric power line NL3. The relay 155 is electrically connected between the electric power line PL1 and the electric power line PL2. The relay 156 is electrically connected between the electric power line NL3 and the electric power line NL2. The relay 157 is electrically connected between the electric power line PL3 and the electric power line PL2. The closing/opening of each of the relays 151 to 157 is controlled in accordance with the switching command SW (refer to FIG. 1) from the ECU 100.

FIGS. 3A and 3B are diagrams for showing the state of the charging circuit 15 in each charging mode. Illustrated in FIG. 3A is the state of the electric power storage device 14 and the charging circuit 15 in the high voltage charging mode. Illustrated in FIG. 3B is the state of the electric power storage device 14 and the charging circuit 15 in the ultra high voltage charging mode. The same applies to FIGS. 7A and 7B, which will be described later.

Referring to FIG. 3A, in the high voltage charging mode, the relay 151 is closed, the relay 152 is open, the relay 153 is closed, the relay 154 is open, the relay 155 is open, the relay 156 is closed, and the relay 157 is closed. As a result, the battery 141 and the battery 142 are put into a state of being interconnected in parallel, and thus the high voltage charging mode is suitable for charging at a high voltage (approximately 400 V). The state illustrated in FIG. 3A is an example of the "first state" according to the present disclosure.

In contrast, in the ultra high voltage charging mode, the relay 151 is open, the relay 152 is closed, the relay 153 is open, the relay 154 is closed, the relay 155 is closed, the relay 156 is open, and the relay 157 is open as illustrated in FIG. 3B. As a result, the battery 141 and the battery 142 are put into a state of being interconnected in series, and thus the ultra high voltage charging mode is suitable for charging at an ultra high voltage (approximately 800 V). The state illustrated in FIG. 3B is an example of the "second state" according to the present disclosure.

Control Flow of External Charging Control

Figure 4:
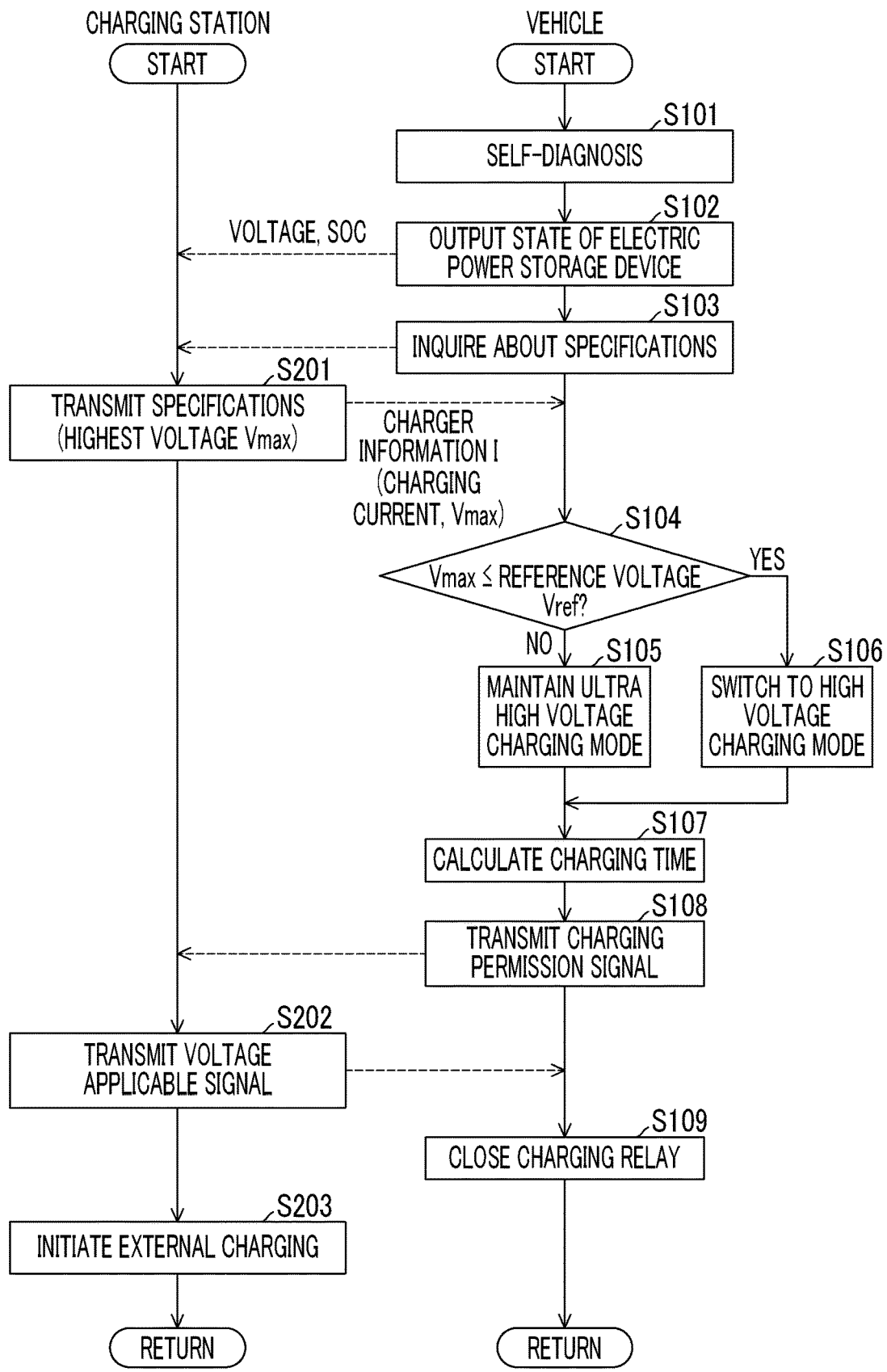
FIG. 4 is a flowchart for showing external charging control according to the first embodiment.

FIG. 4 is a flowchart for showing the external charging control according to the first embodiment. In the flowcharts illustrated in FIG. 4 and FIG. 5 (described later), a series of processing executed by the control device 200 of the charging station 2 is illustrated on the left side of the drawings and a series of processing executed by the ECU 100 of the vehicle 1 is illustrated on the right side of the drawings. Although each step (hereinafter, abbreviated as "S") included in the flowcharts is basically realized by software processing by the ECU 100 of the vehicle 1 or the control device 200 of the charging station 2, each of the steps may also be realized by dedicated hardware (electric circuit) within the ECU 100 of the vehicle 1 or the control device 200 of the charging station 2.

As illustrated in FIG. 1, the vehicle 1 and the charging station 2 are configured to be interconnectable by the charging cable 3. In the example illustrated in FIG. 4, the vehicle 1 has the state of the ultra high voltage charging mode (refer to FIG. 3B) as the default state thereof where the charging cable 3 is yet to be connected. The charging relay 13 is open.

The ECU 100 of the vehicle 1 calls the processing illustrated on the right side of FIG. 4 from a main routine (not illustrated) and executes the processing on condition that the connector 31 of the charging cable 3 is connected to the inlet 11.

In S101, the ECU 100 of the vehicle 1 executes self-diagnosis on whether or not the vehicle 1 side is in an externally chargeable state prior to external charging initiation. More specifically, the ECU 100 of the vehicle 1 detects abnormalities related to the electric power storage device 14 and sensors thereof (such as a current sensor (not illustrated)). Although not described in detail, the abnormality detection as described above can be realized by, for example, a self-diagnosis signal automatically output from each device or sensor in case of failure.

Once the ECU 100 of the vehicle 1 confirms as a result of the self-diagnosis that the electric power storage device 14 and the sensors thereof are in a normal state, the ECU 100 of the vehicle 1 establishes communication with the charging station 2 connected via the charging cable 3 in accordance with a predetermined communication method (such as controller area network (CAN)). Then, the ECU 100 of the vehicle 1 outputs information indicating the current state of the electric power storage device 14 (information relating to, for example, the voltage and the SOC of each of the batteries 141, 142) to the charging station 2 (S102). In addition, the ECU 100 of the vehicle 1 inquires of the charging station 2 about the specifications of the charging station 2 (S103).

In response to the inquiry from the ECU 100 of the vehicle 1, the control device 200 of the charging station 2 transmits the charger information I related to the specifications of the charging station 2, information including a charging current, the highest voltage Vmax allowing charging, and the like to be more specific, to the ECU 100 of the vehicle 1 (S201).

In S104, the ECU 100 of the vehicle 1 compares the highest voltage Vmax of the charging station 2 to a predetermined reference voltage Vref (such as 500 V). In a case where the highest voltage Vmax is equal to or lower than the reference voltage Vref (YES in S104), the ECU 100 of the vehicle 1 switches the charging mode for the external charging from the ultra high voltage charging mode to the high voltage charging mode (S106). More specifically, the ECU 100 of the vehicle 1 outputs the switching command SW for realizing the state illustrated in FIG. 3A to each of the relays 151 to 157 in the charging circuit 15.

In a case where the highest voltage Vmax is higher than the reference voltage Vref (NO in S104), the ECU 100 of the vehicle 1 maintains the ultra high voltage charging mode as the charging mode of the external charging (S105). In this case, output of the switching command SW for realizing the state illustrated in FIG. 3B continues.

Once the charging mode selection (processing in S105 and S106) is completed, the ECU 100 of the vehicle 1 calculates the time demanded for the external charging (charging time) (S107). The charging time can be calculated based on, for example, the full charge capacity of the electric power storage device 14, the SOC of the electric power storage device 14, and the electric power supplied from the charging station 2 (voltage and charging current). A user can be informed of the estimated completion time of the external charging by the charging time calculated by the ECU 100 of the vehicle 1 being transmitted to, for example, the user's portable terminal (such as a smartphone).

In S108, the ECU 100 of the vehicle 1 transmits a signal permitting external charging initiation (charging permission signal) to the charging station 2. Upon receiving the charging permission signal, the control device 200 of the charging station 2 transmits a signal indicating that voltage application from the charging station 2 is possible (voltage applicable signal) to the ECU 100 of the vehicle 1 (S202).

Then, the charging relay 13 is closed by the ECU 100 of the vehicle 1 (S109) and the external charging in the charging mode selected in the processing of S105 and S106 is initiated (S203). After the above, the processing is returned to the main routine and the external charging is executed. Control during the external charging is equivalent to general control, and thus detailed description thereof will not be repeated.

As described above, in the first embodiment, the information related to the specifications (highest voltage Vmax) of the charging station 2 is acquired as the charger information I by the ECU 100 of the vehicle 1 prior to external charging initiation. In a case where the charger information I indicates that the charging station 2 is an external charger responding to charging at a high voltage (400 V), charging in the high voltage charging mode is performed and the battery 141 and the battery 142 are interconnected in parallel. In contrast, in a case where the charger information I indicates that the charging station 2 is an external charger responding to charging at an ultra high voltage (800 V), charging in the ultra high voltage charging mode is performed and the battery 141 and the battery 142 are interconnected in series. By the charger information I being acquired as described above, appropriate external charging can be performed in accordance with the specifications of the charging station 2.

The charging time can be shortened because charging with large electric power can be performed in a short time by means of the highest possible voltage (highest voltage Vmax). Furthermore, as the electric power storage device 14 is divided into the two batteries 141, 142, switching can be performed between charging at a high voltage (400 V) and charging at an ultra high voltage (800 V) even without a voltage adjustment device (such as a DC/DC converter). In other words, the charging voltage can be switched with a simple configuration.

Modification Example of First Embodiment

According to the description of the first embodiment, exchange of the charger information I is performed by communication between the vehicle 1 and the charging station 2. However, the communication with the control device 200 of the charging station 2 is not indispensable for the acquisition of the charger information I by the ECU 100 of the vehicle 1. In a modification example of the first embodiment, the specifications of the charging station 2 are acquired based on position information.

Figure 5:
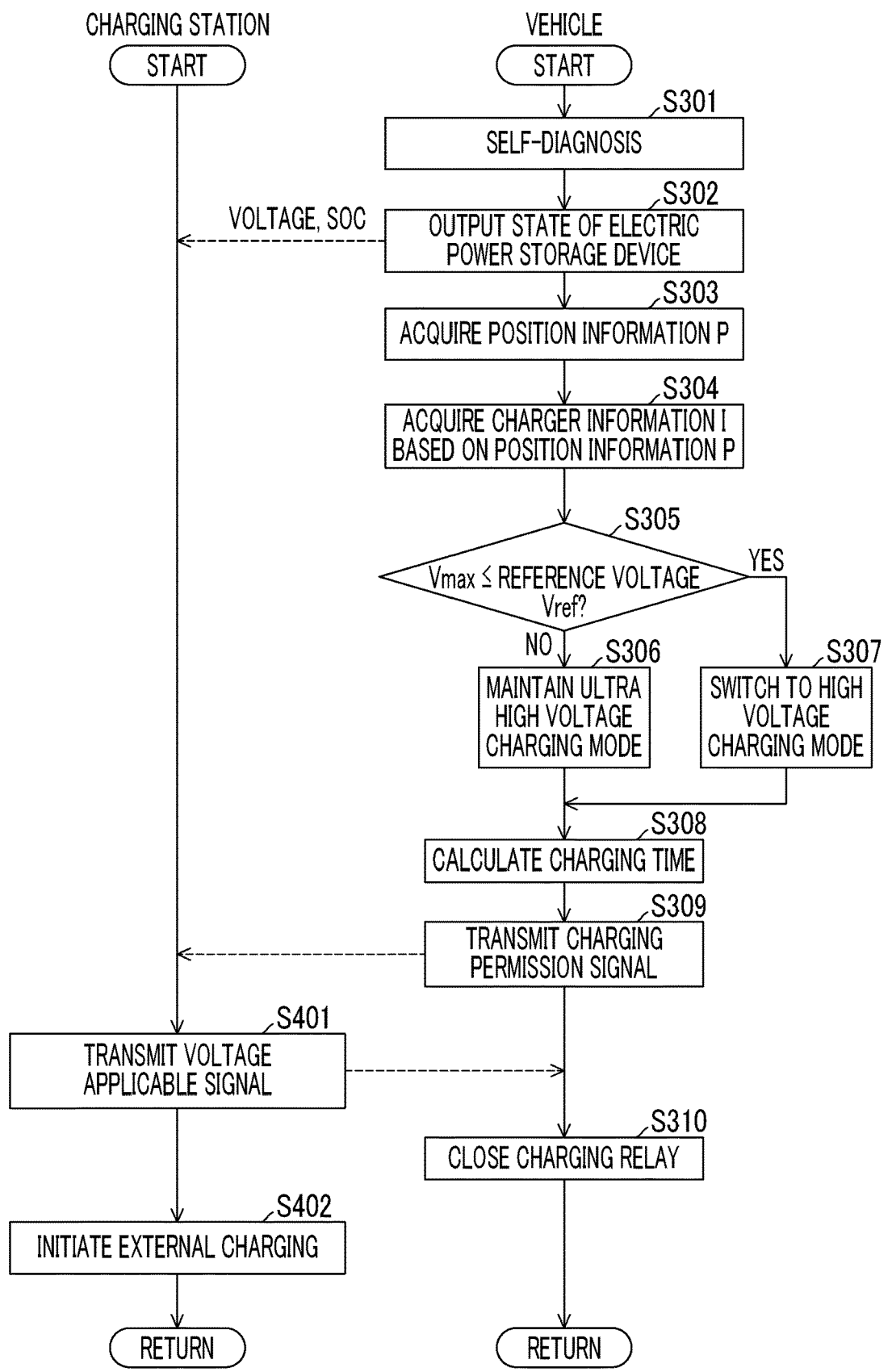
FIG. 5 is a flowchart for showing external charging control according to a modification example of the first embodiment.

FIG. 5 is a flowchart for showing the external charging control according to the modification example of the first embodiment. Referring to FIG. 5, in S301, the ECU 100 of the vehicle 1 executes the self-diagnosis prior to external charging initiation. Once the ECU 100 of the vehicle 1 confirms the normal state as a result of the self-diagnosis, the ECU 100 of the vehicle 1 establishes the communication and outputs the information indicating the current state of the electric power storage device 14 to the charging station 2 (S302).

In S303, the ECU 100 of the vehicle 1 acquires the position information regarding the vehicle 1 by using the GPS device 120. The position of the vehicle 1 is almost the same as the position of the charging station 2, and thus position information P regarding the charging station 2 can be acquired from the position information regarding the vehicle 1.

In S304, the ECU 100 of the vehicle 1 acquires the specifications of the charging station 2 from the position information regarding the vehicle 1. More specifically, the position of the Charging station is fixed and does not change after installation. Accordingly, data (such as a map) or the like can be created in which the position information P regarding the charging station on road map data is associated with the charger information I regarding the charging station installed at the position (information on the specifications including the highest voltage Vmax). The data is stored in the memory (not illustrated) of the ECU 100 of the vehicle 1. In this manner, the ECU 100 of the vehicle 1 is capable of specifying the charger information I regarding the charging station 2 from the position information P regarding the vehicle 1 and acquiring the specifications of the charging station 2 (such as the highest voltage Vmax) from the specified charger information I.

It is conceivable that a new charging station is installed or an existing charging station is replaced with a new charging station with time. Accordingly, it is desirable that the data is regularly updated by data transmitted from a data center (not illustrated) handling road map data. In a case where the vehicle 1 is externally charged by the charging station 2, the data may be updated based on, for example, the actually acquired voltage of the external charging.

The processing following S305 is equivalent to the corresponding processing according to the first embodiment, and thus detailed description thereof will not be repeated.

As described above, in the modification example of the first embodiment, the position information P regarding the charging station 2 is acquired from the position information regarding the vehicle 1 prior to external charging initiation. As the ECU 100 of the vehicle 1 has the data defining the correspondence relationship between the position information P and the charger information I, the charger information I can be acquired from the position information P. By the charger information I being acquired as described above, appropriate external charging can be performed in accordance with the specifications of the charging station 2 as in the case of the first embodiment.

In the overall configuration illustrated in FIG. 1, the voltage of direct current electric power from the charging station 2 is detected by the voltage sensor 12 once the direct current electric power is output in a state where the charging relay 13 is open. As a result, the ECU 100 of the vehicle 1 is capable of acquiring whether the voltage of the electric power supplied from the charging station 2 is a high voltage (400 V) or an ultra high voltage (800 V). The communication of the charger information I between the vehicle 1 and the charging station 2 can be omitted also in a case where the above-described configuration is adopted.

Second Embodiment

According to the description of the configuration of the first embodiment, the connection relationship of the batteries 141, 142 included in the electric power storage device 14 is switched between series connection and parallel connection. Alternatively, the connection relationship of an electric power storage device and a DC/DC converter may be switched as described below. The configuration of the external charging system according to a second embodiment differs from the configuration of the external charging system 9 according to the first embodiment (refer to FIG. 1) in that an electric power storage device 14A and a charging circuit 15A are provided instead of the electric power storage device 14 and the charging circuit 15. The rest of the configuration is common to the corresponding configuration of the external charging system 9 according to the first embodiment.

Figure 6:
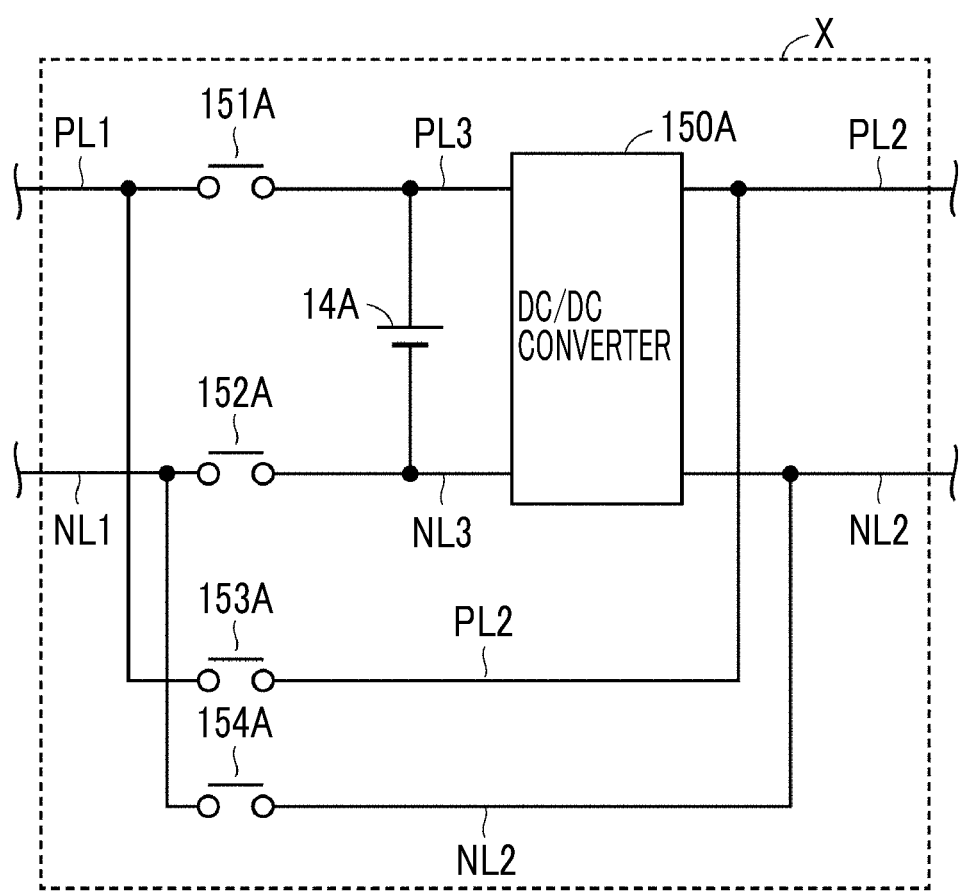
FIG. 6 is a diagram illustrating the configuration of an electric power storage device and a charging circuit according to a second embodiment in more detail.

FIG. 6 is a diagram illustrating the configuration of the electric power storage device 14A and the charging circuit 15A (configuration of the region surrounded by the dotted-line frame X in FIG. 1) according to the second embodiment in more detail. Referring to FIG. 6, the electric power storage device 14A according to the second embodiment is electrically connected between the electric power line PL3 and the electric power line NL3. The voltage of the electric power storage device 14A is an ultra high voltage (such as approximately 800 V).

The charging circuit 15A includes, for example, relays 151A to 154A disposed on the electric power lines PL1 to PL3 and NL1 to NL3 and a DC/DC converter 150A.

The relay 151A is electrically connected between the electric power line PL1 and the electric power line PL3. The relay 152A is electrically connected between the electric power line NL1 and the electric power line NL3. The relay 153A is electrically connected between the electric power line PL1 and the electric power line PL2. The relay 154A is electrically connected between the electric power line NL1 and the electric power line NL2. The closing/opening of each of the relays 151A to 154A is controlled in accordance with the switching command SW (refer to FIG. 1) from the ECU 100.

The DC/DC converter 150A performs a step-up operation or a step-down operation between the voltage between the electric power lines PL3, NL3 and the voltage between the electric power lines PL2, NL2. More specifically, the DC/DC converter 150A steps up the high voltage between the electric power line PL2 and the electric power line NL2 (approximately 400 V) to an ultra high voltage (approximately 800 V) in accordance with a control command from the ECU 100 and supplies the ultra high voltage to the electric power storage device 14A. In addition, the DC/DC converter 150A is capable of stepping down the voltage of the electric power storage device 14A (approximately 800 V) to a lower voltage (such as approximately 400 V) and supplying the lower voltage to the PCU 16. In other words, the DC/DC converter 150A is an example of the "step-up device" or the "step-up and step-down device" according to the present disclosure.

FIGS. 7A and 7B are diagrams for showing the state of the electric power storage device 14A and the charging circuit 15A in each charging mode. In the high voltage charging mode, the relays 151A, 152A are open and the relays 153A, 154A are closed as illustrated in FIG. 7A. The step-up operation by the DC/DC converter 150A is performed. As a result, the high voltage (400 V) electric power supplied from the charging station 2 is stepped up to an ultra high voltage (800 V) by the DC/DC converter 150A and the electric power storage device 14A is charged therewith.

In contrast, in the ultra high voltage charging mode, the relays 151A, 152A are closed and the relays 153A, 154A are open as illustrated in FIG. 7B. As a result, the electric power storage device 14A is charged with the ultra high voltage (approximately 800 V) electric power supplied from the charging station 2 via the relays 151A, 152A, that is, not via the DC/DC converter 150A.

The control flow of the external charging control according to the second embodiment is basically equivalent to the control flow according to the first embodiment (refer to FIG. 4), and thus detailed description thereof will not be repeated.

As described above, in the second embodiment, the information related to the specifications of the charging station 2 (charger information I) is acquired as the charger information I by the ECU 100 prior to external charging initiation as in the first embodiment. In a case where the charger information I indicates that the charging station 2 is an external charger responding to charging at a high voltage, charging in the high voltage charging mode is performed and the electric power storage device 14A is charged with the electric power supplied from the charging station 2 after the electric power is stepped up by the DC/DC converter 150A. In contrast, in a case where the charger information I indicates that the charging station 2 is an external charger responding to charging at an ultra high voltage, the electric power supplied from the charging station 2 is neither stepped up nor stepped down and the electric power storage device 14A is charged with the electric power as it is. By the charger information I being acquired as described above, appropriate external charging can be performed in accordance with the specifications of the charging station 2.

In the example described with reference to FIGS. 6 and 7B, the voltage of the electric power storage device 14A is an ultra high voltage (800 V). However, by the configuration of the charging circuit 15A being appropriately changed, charging voltage switching in accordance with the specifications of the charging station 2 can still be performed in a case where the voltage of the electric power storage device 14A is a high voltage (400 V). Also in the second embodiment (and a third embodiment to be described below), the charger information I may be acquired based on the position information P of the charging station 2 as described in the modification example of the first embodiment.

Third Embodiment

According to the description of the configuration of the first and second embodiments, the charging station 2 is an external charger for performing DC charging and switches the height of the charging voltage of direct current electric power. However, switching targets are not limited to the height of the charging voltage. In the third embodiment, a configuration in which switching is performed between AC charging and DC charging will be described. The overall configuration of the external charging system according to the third embodiment is common to the overall configuration of the external charging system 9 according to the first embodiment (refer to FIG. 1) except that an electric power storage device 14B and a charging circuit 15B are provided instead of the electric power storage device 14 and the charging circuit 15.

Figure 8:
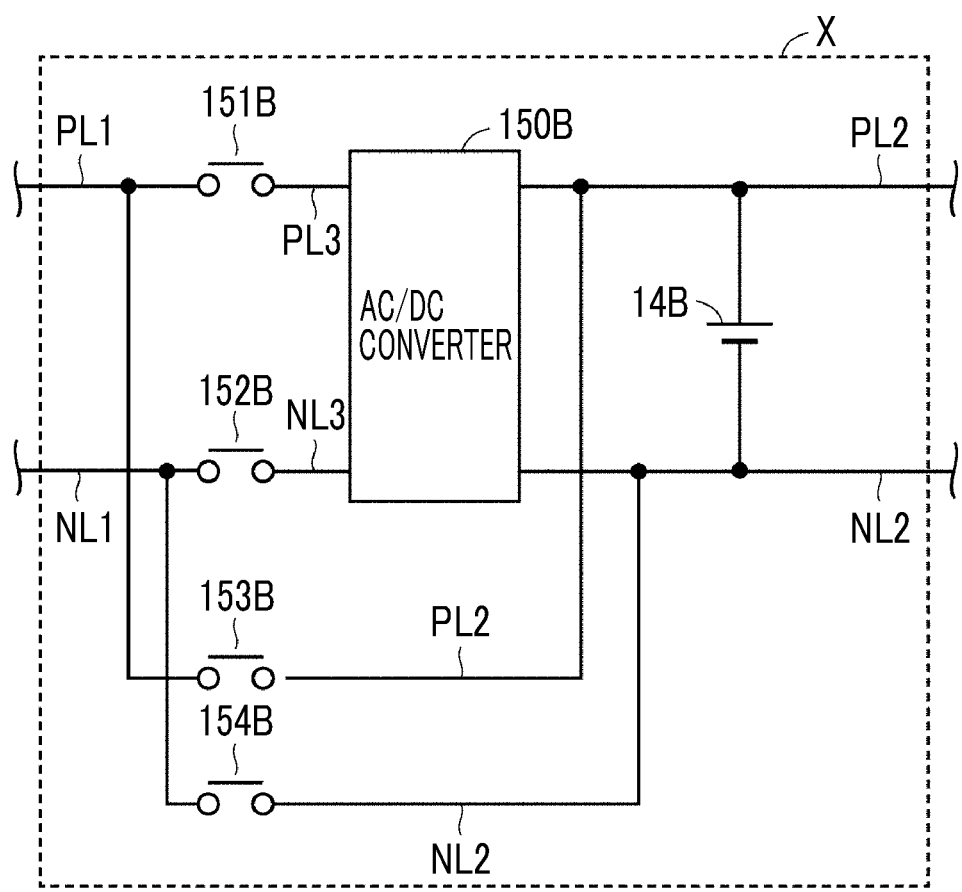
FIG. 8 is a diagram illustrating the configuration of an electric power storage device and a charging circuit according to a third embodiment in more detail.

FIG. 8 is a diagram illustrating the configuration of the electric power storage device 14B and the charging circuit 15B according to the third embodiment in more detail. Referring to FIG. 8, the electric power storage device 14B is electrically connected between the electric power line PL2 and the electric power line NL2. The voltage of the electric power storage device 14B is, for example, an ultra high voltage of approximately 800 V. Alternatively, the voltage of the electric power storage device 14B may be approximately 400 V.

The charging circuit 15B includes relays 151B to 154B disposed on the electric power lines PL1 to PL3 and NL1 to NL3 and an AC/DC converter 150B.

The relay 151B is electrically connected between the electric power line PL1 and the electric power line PL3. The relay 152B is electrically connected between the electric power line NL1 and the electric power line NL3. The relay 153B is electrically connected between the electric power line PL1 and the electric power line PL2. The relay 154B is electrically connected between the electric power line NL1 and the electric power line NL2. The closing/opening of each of the relays 151B to 154B is controlled in accordance with the switching command SW (refer to FIG. 1) from the ECU 100.

The AC/DC converter 150B performs an AC/DC conversion operation between the voltage between the electric power lines PL3, NL3 and the voltage between the electric power lines PL2, NL2. More specifically, in a case where the charging station 2 is an alternating current charger, the AC/DC converter 150B converts alternating current electric power from the charging station 2 into direct current electric power in accordance with a control command (not illustrated) from the ECU 100 and supplies the direct current electric power to the electric power storage device 14B. The AC/DC converter 150B is an example of the "electric power conversion device" according to the present disclosure.

In the external charging system configured as described above, the ECU 100 has an "AC charging mode" for performing AC charging and a "DC charging mode" for performing DC charging.

FIGS. 9A and 9B are diagrams for showing the state of the electric power storage device 14B and the charging circuit 15B in each charging mode. Illustrated in FIG. 9A is the state of the electric power storage device 14B and the charging circuit 15B in the AC charging mode. Illustrated in FIG. 9B is the state of the electric power storage device 14B and the charging circuit 15B in the DC charging mode.

In the AC charging mode, the relays 151B, 152B are closed and the relays 153B, 154B are open as illustrated in FIG. 9A. The AC/DC conversion operation by the AC/DC converter 150B is performed. As a result, the alternating current electric power supplied from the charging station 2 is converted into direct current electric power by the AC/DC converter 150B and the electric power storage device 14B is charged therewith.

In contrast, in the DC charging mode, the relays 151B, 152B are open and the relays 153B, 154B are closed as illustrated in FIG. 9B. As a result, the electric power storage device 14B is charged with the direct current electric power supplied from the charging station 2 not via AC/DC converter 150B.

The control flow of the external charging control according to the third embodiment is basically equivalent to the control flow according to the first embodiment (refer to FIG. 4), and thus detailed description thereof will not be repeated.

As described above, in the third embodiment, the information related to whether the electric power supplied from the charging station 2 is direct current electric power or alternating current electric power is acquired as the charger information I by the ECU 100 prior to external charging initiation as in the first and second embodiments. In a case where the charger information I indicates that the charging station 2 is an alternating current charger, charging in the AC charging mode is performed and the electric power storage device 14B is charged with the electric power supplied from the charging station 2 after the AC/DC converter 150B performs AC/DC conversion on the electric power. In contrast, in a case where the charger information I indicates that the charging station 2 is a direct current charger, the AC/DC conversion is not performed and the electric power storage device 14B is charged with the direct current electric power from the charging station 2 as it is. By the charger information I being acquired as described above, appropriate external charging can be performed in accordance with the specifications of the charging station 2 also in the third embodiment.

Exemplified in the first to third embodiments is the configuration of so-called "contact charging" during which external charging is performed in a state where the vehicle 1 and the charging station 2 are interconnected by the charging cable 3. However, the physical connection by the charging cable 3 is not indispensable. The electrically powered vehicle according to the present disclosure is also applicable to "non-contact charging" during which electric power is transmitted in a state where the vehicle 1 and the charging station 2 are not in contact with each other.

It should be noted that the embodiments of the present disclosure are illustrative in all respects and are not restrictive. The scope of the present disclosure is indicated by the scope of the claims, not the above description of the embodiments, and is intended to include meanings equivalent to the claims and all changes within the scope.

What is claimed is:

1. An electrically powered vehicle comprising:
   electric power lines through which electric power supplied from an external charger flows, the external charger being configured to supply direct current electric power;
   an electric power storage device electrically connected to the electric power lines, the electric power storage device being configured to be charged with the electric power from the external charger;
   a charging circuit electrically connected to the electric power lines, the charging circuit being configured to switch a connection state of the electric power storage device and the electric power lines between a first state and a second state in accordance with a given command, and the charging circuit being configured to charge the electric power storage device in either the first state or the second state, the first state being a connection state for charging the electric power storage device at a first specified voltage, the second state being a connection state for charging the electric power storage device at a second specified voltage higher than the first specified voltage, the charging circuit including a step-up device and a plurality of relays, the step-up device being configured to step up a voltage of the direct current electric power supplied from the external charger, the relays being configured such that switching between opening and closing of each of the relays is controlled in accordance with the command, the relays being controlled, in the first state, such that the electric power storage device is charged with the voltage of the direct current electric power from the external charger stepped up by the step-up device, and the relays being controlled, in the second state, such that the electric power storage device is charged with the voltage of the direct current electric power from the external charger not via the step-up device; and an electronic control unit configured to
acquire charger information indicating information related to a specification of the external charger including electric power to be suppliable from the external charger,
generate the command by using the acquired charger information, and
output the command to the charging circuit, wherein the electronic control unit is configured to
acquire, as the charger information, information related to a highest voltage of direct current electric power to be suppliable from the external charger,
generate the command such that the connection state becomes the first state when the highest voltage is equal to or lower than a predetermined voltage, and
generate the command such that the connection state becomes the second state when the highest voltage is higher than the predetermined voltage.

2. The electrically powered vehicle according to claim 1, wherein:
the electric power storage device includes a first electric power storage unit and a second electric power storage unit;
the relays are configured such that switching between opening and closing of each of the relays is controlled in accordance with the command;
in the first state, the relays are controlled such that the first electric power storage unit and the second electric power storage unit are interconnected in parallel; and
in the second state, the relays are controlled such that the first electric power storage unit and the second electric power storage unit are interconnected in series.

3. The electrically powered vehicle according to claim 1, further comprising:
a drive device configured to generate a drive force of the electrically powered vehicle by using electric power,
wherein the step-up device is a step-up and step-down device configured to step up the voltage of the direct current electric power supplied from the external charger to the electric power storage device, and step down a voltage supplied from the electric power storage device to the drive device.

4. An electrically powered vehicle comprising:
electric power lines through which electric power supplied from an external charger flows;
an electric power storage device electrically connected to the electric power lines, the electric power storage device being configured to be charged with the electric power from the external charger;
a charging circuit electrically connected to the electric power lines, the charging circuit being configured to switch a connection state of the electric power storage device and the electric power lines between a first state and a second state in accordance with a given command, and the charging circuit being configured to charge the electric power storage device in either the first state or the second state; and
an electronic control unit configured to
acquire charger information indicating information related to a specification of the external charger including electric power to be suppliable from the external charger,
generate the command by using the acquired charger information, and
output the command to the charging circuit, wherein the charger information includes information indicating whether the electric power supplied from the external charger is direct current electric power or alternating current electric power;
the charging circuit includes an electric power conversion device and a plurality of relays;
the electric power conversion device is configured to convert the alternating current electric power supplied from the external charger into direct current electric power when the external charger supplies the alternating current electric power;
the relays are configured such that switching between opening and closing of each of the relays is controlled in accordance with the command;
in the first state, the relays are controlled such that the electric power storage device is charged with the alternating current electric power from the external charger converted into the direct current electric power by the electric power conversion device; and
in the second state, the relays are controlled such that the electric power storage device is charged with the direct current electric power from the external charger not via the electric power conversion device.

5. The electrically powered vehicle according to claim 1, wherein the electronic control unit is configured to output the command to the charging circuit before initiation of execution of external charging.

6. The electrically powered vehicle according to claim 1, further comprising:
a communication device configured to perform communication with the external charger,
wherein the electronic control unit is configured to acquire the charger information via the communication between the external charger and the communication device.

7. The electrically powered vehicle according to claim 1, further comprising:
a position information acquirer configured to acquire position information regarding the external charger,
wherein the electronic control unit is configured to acquire the charger information by using the position information acquired by the position information acquirer.

8. A control method for an electrically powered vehicle including electric power lines through which electric power supplied from an external charger flows, an electric power storage device electrically connected to the electric power lines, a charging circuit electrically connected to the electric power lines, and an electronic control unit, the electric power storage device being configured to be charged with the electric power from the external charger, and the charging circuit being configured to switch a connection state of the electric power storage device and the electric power lines between a first state and a second state in accordance with a given command and the charging circuit being configured to charge the electric power storage device in either the first state or the second state, the external charger being configured to supply direct current electric power, the first state being a connection state for charging the electric power storage device at a first specified voltage, the second state being a connection state for charging the electric power storage device at a second specified voltage higher than the first specified voltage, the charging circuit including a step-up device and a plurality of relays, the step-up device being configured to step up a voltage of the direct current electric power supplied from the external charger, the relays being configured such that switching between opening and closing of each of the relays is controlled in accordance with the command, the relays being controlled, in the first state, such that the electric power storage device is charged with the voltage of the direct current electric power from the external charger stepped up by the step-up device, and the relays being controlled, in the second state, such that the electric power storage device is charged with the voltage of the direct current electric power from the external charger not via the step-up device, the control method comprising:

acquiring, by the electronic control unit, as charger information indicating information related to a specification of the external charger including electric power to be suppliable from the external charger, information related to a highest voltage of direct current electric power to be suppliable from the external charger;

generating, by the electronic control unit, the command such that the connection state becomes the first state when the highest voltage is equal to or lower than a predetermined voltage;

generating, by the electronic control unit, the command such that the connection state becomes the second state when the highest voltage is higher than the predetermined voltage; and outputting, by the electronic control unit, the command based on the acquired charger information to the charging circuit.

\* \* \* \* \*